(12) United States Patent
Daly et al.

(10) Patent No.: US 10,354,465 B2
(45) Date of Patent: Jul. 16, 2019

(54) COGNITIVE INTERCOM ASSISTANT

(71) Applicant: INTERNATIONAL BUSINESS MACHINES CORPORATION, Armonk, NY (US)

(72) Inventors: Elizabeth Daly, Dublin (IE); Martin Stephenson, Ballynacargy (IE); Pierpaolo Tommasi, Ellis Quay (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/029,062

(22) Filed: Jul. 6, 2018

(65) Prior Publication Data
US 2018/0365920 A1    Dec. 20, 2018

Related U.S. Application Data

(63) Continuation of application No. 15/622,437, filed on Jun. 14, 2017.

(51) Int. Cl.
| G05B 19/00 | (2006.01) |
| G07C 9/00 | (2006.01) |
| G06Q 10/00 | (2012.01) |
| H04W 4/21 | (2018.01) |
| H04W 4/70 | (2018.01) |

(52) U.S. Cl.
CPC ......... *G07C 9/00309* (2013.01); *G06Q 10/00* (2013.01); *G07C 9/00007* (2013.01); *G07C 9/00174* (2013.01); *G07C 9/00571* (2013.01); *G07C 9/00563* (2013.01); *H04W 4/21* (2018.02); *H04W 4/70* (2018.02)

(58) Field of Classification Search
None
See application file for complete search history.

(56) References Cited

U.S. PATENT DOCUMENTS

| 7,239,725 B2 | 7/2007 | Dobashi |
| 7,315,823 B2* | 1/2008 | Brondrup ............... G06Q 10/02 705/5 |
| 7,623,640 B2 | 11/2009 | Lee |
| 7,936,885 B2 | 5/2011 | Frank et al. |
| 9,113,051 B1 | 8/2015 | Scalisi |
| 9,312,926 B2* | 4/2016 | Neafsey ............... H04B 5/0056 |
| 9,425,981 B2* | 8/2016 | Foster ................. H04L 12/2825 |

(Continued)

OTHER PUBLICATIONS

Anonymous, "System and Method for Detecting Visitors/Co-Workers in Any Given Physical Location and Connecting the Same with Associated Contacts List," An IP.com Prior Art Database Technical Disclosure, IP.com No. IPCOM000246070D, May 2, 2016 (4 pages).

(Continued)

*Primary Examiner* — K. Wong
(74) *Attorney, Agent, or Firm* — Griffiths & Seaton PLLC

(57) ABSTRACT

Embodiments for intelligent premise security access management by a processor. Identification information of a user requesting access to enter a premise via a premise entry may be authenticated using a knowledge domain of trusted users in an Internet of Things (IoT) computing network. Entry access to the premise may be granted via the premise entry upon authenticating the identification information.

15 Claims, 14 Drawing Sheets

(56) References Cited

U.S. PATENT DOCUMENTS

| | | | |
|---|---|---|---|
| 9,619,954 B2 * | 4/2017 | Allibhoy | G07C 9/00309 |
| 9,728,017 B2 * | 8/2017 | Paquin | G07C 9/00007 |
| 9,764,313 B2 * | 9/2017 | Trukhan | B01J 29/763 |
| 2009/0153660 A1 | 6/2009 | Liu | |
| 2014/0125754 A1 | 5/2014 | Haywood | |

OTHER PUBLICATIONS

Balap et al., "A Critical Review on Wavelet Based Feature Extraction for Iris Recognition," 2017 11th International Conference on Intelligent Systems and Control (ISCO), 2017 (6 pages).

* cited by examiner

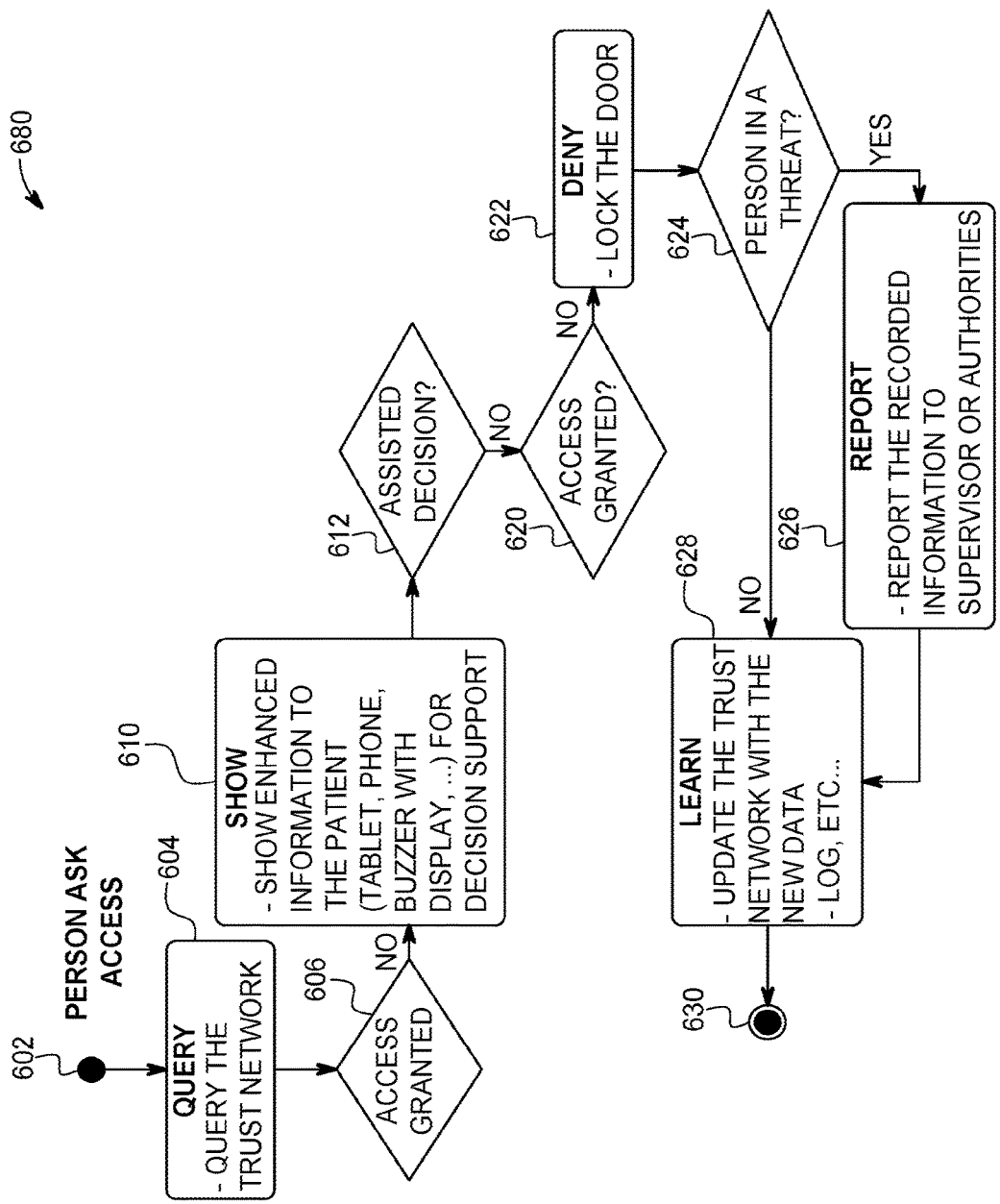

COGNITIVE INTERCOM ASSISTANT

CROSS REFERENCE TO RELATED APPLICATIONS

This Application is a Continuation of U.S. patent application Ser. No. 15/622,437, filed on Jun. 14, 2017.

BACKGROUND OF THE INVENTION

Field of the Invention

The present invention relates in general to computing systems, and more particularly to, various embodiments for intelligent premise security access management using a cognitive intercom assistant by a processor.

Description of the Related Art

In today's interconnected and complex society, computers and computer-driven equipment are more commonplace. Processing devices, with the advent and further miniaturization of integrated circuits, have made it possible to be integrated into a wide variety of devices for personal, business, health, home, education, scientific, or governmental related areas of interest. Accordingly, the use of computers, network appliances, and similar data processing devices continue to proliferate throughout society, particularly in health care and security industry environments.

SUMMARY OF THE INVENTION

Various embodiments for intelligent premise security access management using a cognitive intercom assistant by a processor, are provided. In one embodiment, by way of example only, a method comprises (a) authenticating identification information of a user requesting access to enter a premise via a premise entry using a knowledge domain of trusted users in an Internet of Things (IoT) computing network; (b) granting entry access to the premise via the premise entry upon authenticating the identification information; (c) collecting public information data of a plurality of persons from one or more public information databases; (d) storing the public information data of the plurality of persons in the knowledge domain of trusted users; and (e) comparing the public information data of the plurality of persons to the identification information to determine whether the identification information of the user matches the public information data of one of the plurality of persons.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIG. 6H is a flowchart diagram depicting an additional exemplary method for detecting an additional threat using a cognitive intercom assistant by a processor, again in which aspects of the present invention may be realized.

DETAILED DESCRIPTION OF THE DRAWINGS

Figure 1:
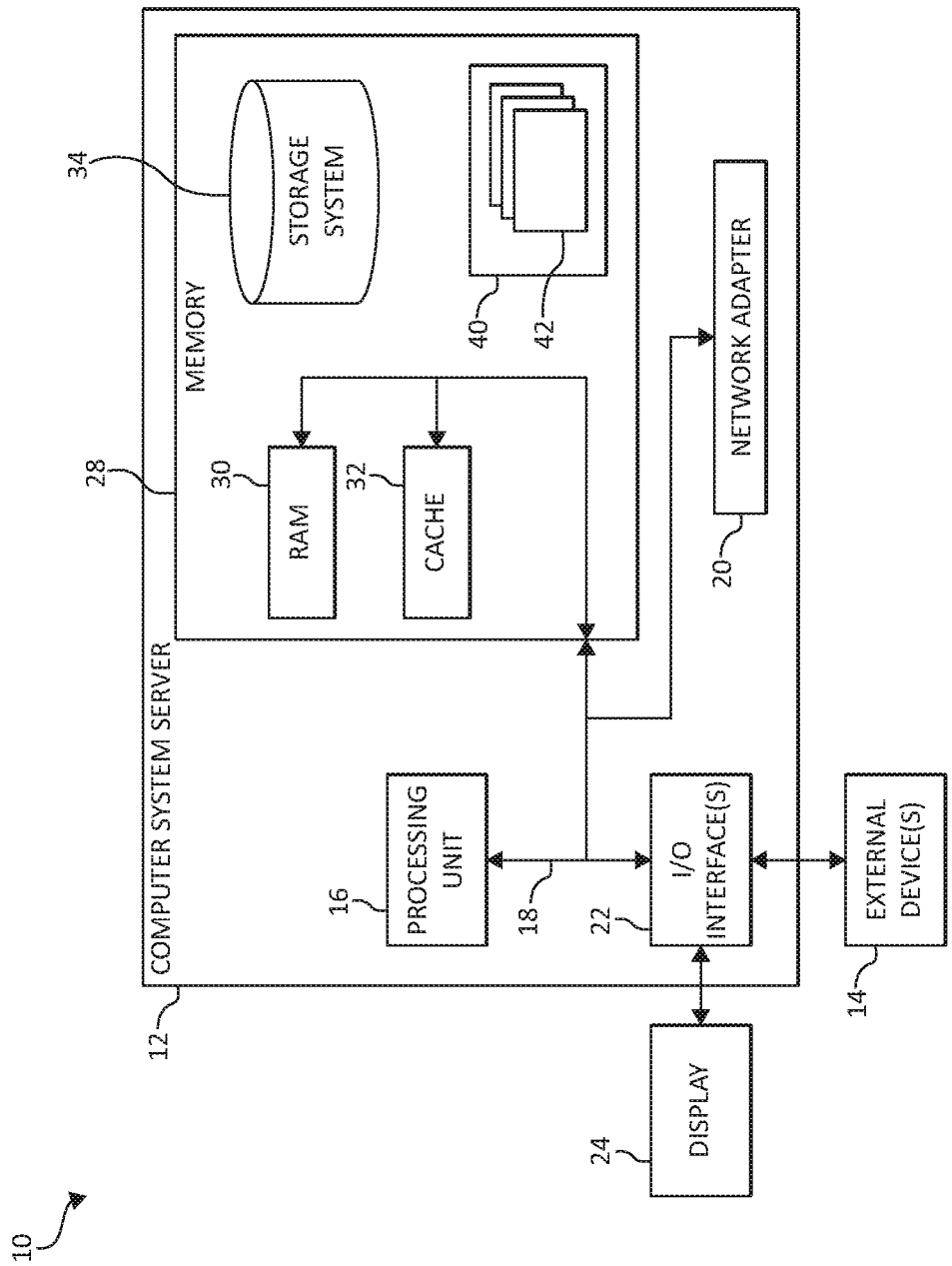
FIG. 1 is a block diagram depicting an exemplary computing node according to an embodiment of the present invention.

The Internet of Things (IoT) is an emerging concept of computing devices that may be embedded in objects, especially appliances, and connected through a network. An IoT network may include one or more IoT devices or "smart devices", which are physical objects such as appliances with computing devices embedded therein. Examples of network-enabled appliances may include computers, smart phones, laptops, home appliances, audio systems, televisions, security cameras, security sensors, among countless other examples.

As computing systems continue to increase in technological advancement, the demand for sophisticated security systems also grows. For example, vulnerable individuals suffering from physical or mental challenges, such as elderly or sick persons, commonly require a caregiver to provide assistance with daily activities. Ensuring that access to the individual's residence such as, for example, home, hospital, or assisted living location, is only granted to the trusted caregiver, family member, trusted friends or associates is of critical import. Moreover, providing access to emergency service providers such as, for example, doctors, nurses, law enforcement agents, etc., is also essential to providing needed care in case of emergency situations. Accordingly, a need exists to increase the efficiency providing a cognitive intercom assistant system for authenticating and providing access to one or more trusted persons.

In one aspect, various embodiments provided for intelligent premise security access management using a cognitive intercom assistant by a processor, are provided. Identification information of a user requesting access to enter a premise via a premise entry may be authenticated using a knowledge domain of trusted users in an Internet of Things (IoT) computing network. Entry access to the premise may be granted via the premise entry upon authenticating the identification information.

As an additional aspect, various embodiments provide for information support and access control support to one or more premises via a cognitive identification security system. In one aspect, the present invention automatically grants access to one or more trusted individuals. The trusted individuals may be assigned a trust level whereby each trust level provides or restricts access to one or more premises. For example, a first trust level assigned to a trusted user enables access to all premise locations associated with a premise occupant (e.g., elderly person or sick person). For example, a nurse, child, or parent may be provided access to the elderly person's home, hospital room, assisted living center, or residence of another trusted person associated with the premise occupant. A second trust level be assigned to a trusted user restricts access to a selected number of premise locations associated with a premise occupant (e.g., elderly person or sick person). For example, a close associate of the elderly person may only have access to the elderly person's home front door, while also being restricted from entering the premise of the elderly person's home rear door or restricted from entering the premise of the elderly person's care center/assisted living center.

The present invention automatically provides a decision support operation to the user to enable authorization to grant access to one or more trusted individuals to enter a premise. The decision support operation may include sending contextual information to the user via an intercom system, or other computing device capable of processing and/or sending audio, video, and/or biometric data, to a computing device such as, for example, a mobile communication device, laptop, computer, smart phone, and the like that may be owned or operated by an occupant/resident (e.g., elderly person, sick person, minor child, and the like) of the premise about the visitor.

As part of, or in conjunction with, the authorization process, additional information and assistance may be requested or received from a trusted advisor, having been registered with a knowledge domain of trusted sources or trusted users, in the event the trust level status of one or more visitors are unknown. The present invention may use a trust network such as, for example, using a trust network for authenticating and validating the identification information. In one aspect, the trust network may be the knowledge domain on trusted sources and/or trusted users. The trust network may include a list of trusted sources or persons along with one or more forms of identification of the trusted sources or persons (e.g., mother, daughter, cousin, father, brother, friend) such as, for example, biometric data (e.g., images, retinal data, fingerprints, voice/voice identification data), data relating to labels, radio frequency identification (RFID) tag data, identification badge data, barcode data, or smartcard data. This trust network list may be configurable and may be mined/learned from images on a user's computing devices, social media accounts, and/or visitors' images. Additional data sources such as, for example law enforcement databases (e.g., wanted persons, amber alert systems, persons of interest, etc.) open and available to the public, may also be used to manage the trust network list. The public information may include a list of untrusted people. Trust information that may be provided by the trust network may be portable to one or more various types of devices (e.g., devices of the premise occupant that also may be registered with the trusted network). In one aspect, the contextual information such as, for example, a time of day, location(s), visiting hours at a premise (e.g., assisted living center or hospital), user behavior such as tone of voice, speech analysis, facial expression analysis, or fingerprint data may be used to determine if a visitor is within the acceptable realms of safe behavior and have an assigned level of trust in the trust network. In one aspect, one or more computing devices of each trusted person/source registered with the trust network may also be registered and used as an additional level of authentication.

It should be noted as described herein, the term "cognitive" (or "cognition") may be relating to, being, or involving conscious intellectual activity such as, for example, thinking, reasoning, or remembering, that may be performed using a machine learning. In an additional aspect, cognitive or "cognition may be the mental process of knowing, including aspects such as awareness, perception, reasoning and judgment. A machine learning system may use artificial reasoning to interpret data from one or more data sources (e.g., sensor based devices or other computing systems) and learn topics, concepts, and/or processes that may be determined and/or derived by machine learning.

In an additional aspect, cognitive or "cognition" may refer to a mental action or process of acquiring knowledge and understanding through thought, experience, and one or more senses using machine learning (which may include using sensor based devices or other computing systems that include audio or video devices). Cognitive may also refer to identifying patterns of behavior, leading to a "learning" of one or more events, operations, or processes. Thus, the cognitive model may, over time, develop semantic labels to apply to observed behavior and use a knowledge domain or ontology to store the learned observed behavior. In one embodiment, the system provides for progressive levels of complexity in what may be learned from the one or more events, operations, or processes.

In additional aspect, the term cognitive may refer to a cognitive system. The cognitive system may be a specialized computer system, or set of computer systems, configured with hardware and/or software logic (in combination with hardware logic upon which the software executes) to emulate human cognitive functions. These cognitive systems apply human-like characteristics to conveying and manipulating ideas which, when combined with the inherent strengths of digital computing, can solve problems with a high degree of accuracy (e.g., within a defined percentage range or above an accuracy threshold) and resilience on a large scale. A cognitive system may perform one or more computer-implemented cognitive operations that approximate a human thought process while enabling a user or a computing system to interact in a more natural manner. A cognitive system may comprise artificial intelligence logic, such as natural language processing (NLP) based logic, for example, and machine learning logic, which may be provided as specialized hardware, software executed on hardware, or any combination of specialized hardware and software executed on hardware. The logic of the cognitive system may implement the cognitive operation(s), examples of which include, but are not limited to, question answering, identification of related concepts within different portions of content in a corpus, intelligent search algorithms, such as Internet web page searches.

In general, such cognitive systems are able to perform the following functions: 1) Navigate the complexities of human language and understanding; 2) Ingest and process vast amounts of structured and unstructured data; 3) Generate and evaluate hypothesis'; 4) Weigh and evaluate responses that are based only on relevant evidence; 5) Provide situation-specific advice, insights, estimations, determinations, evaluations, calculations, and guidance; 6) Improve knowledge and learn with each iteration and interaction through machine learning processes; 7) Enable decision making at the point of impact (contextual guidance); 8) Scale in proportion to a task, process, or operation; 9) Extend and magnify human expertise and cognition; 10) Identify resonating, human-like attributes and traits from natural language; 11) Deduce various language specific or agnostic attributes from natural language; 12) High degree of relevant recollection from data points (images, text, voice) (memorization and recall); and/or 13) Predict and sense with situational awareness operations that mimic human cognition based on experiences.

Other examples of various aspects of the illustrated embodiments, and corresponding benefits, will be described further herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
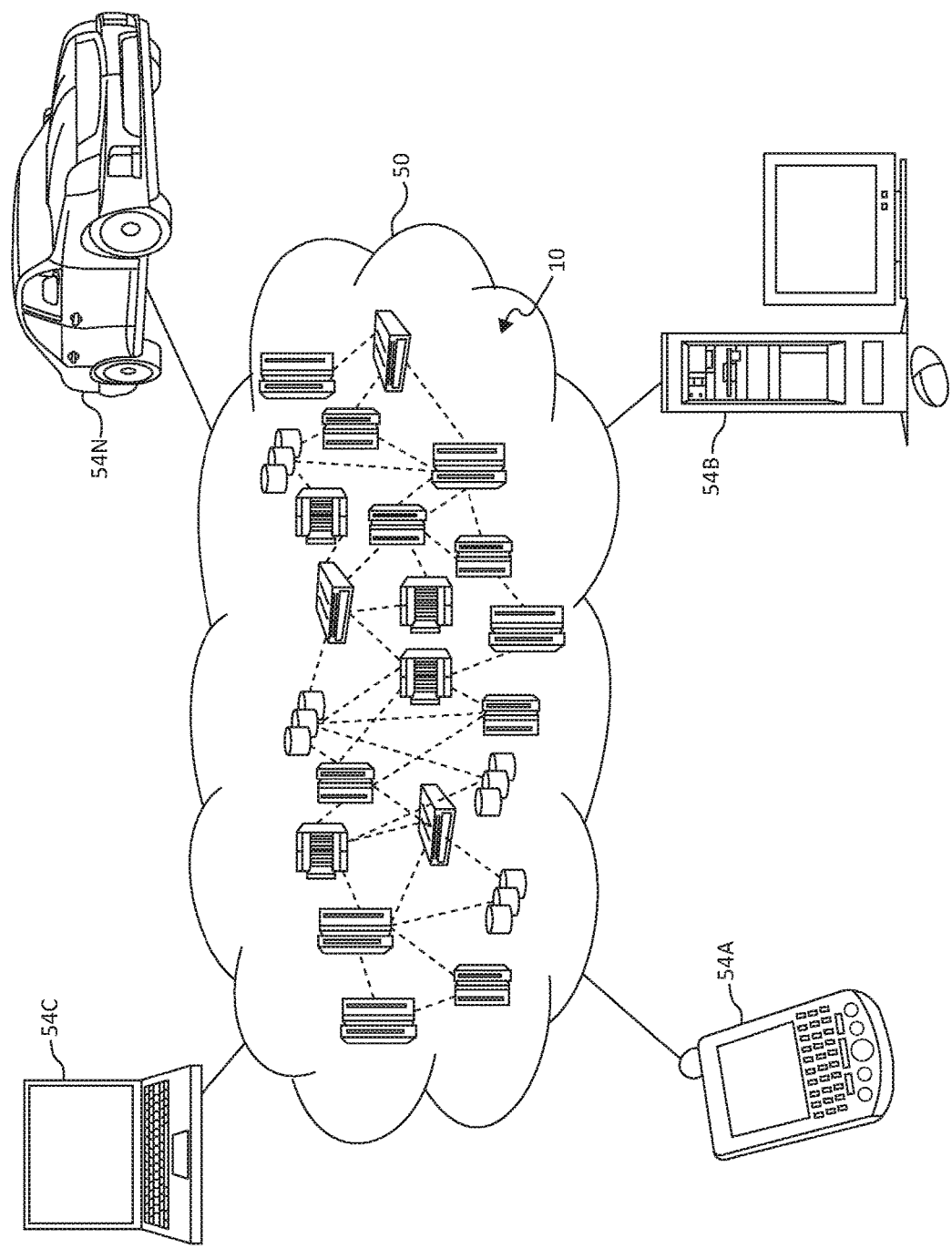
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
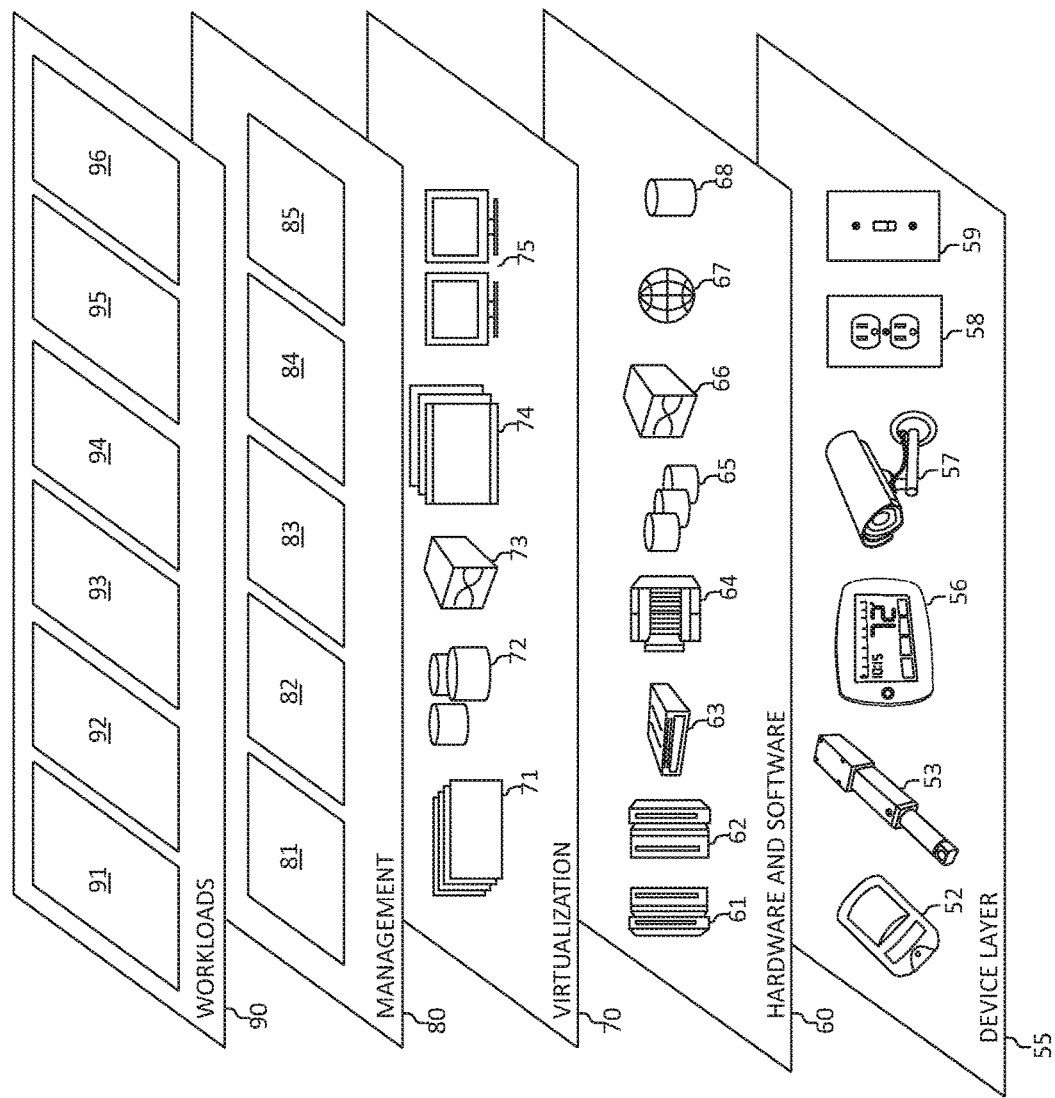
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various intelligent premise security access management workloads and functions 96. In addition, intelligent premise security access management workloads and functions 96 may include such operations as data analytics, data analysis, and as will be further described, notification functionality. One of ordinary skill in the art will appreciate that the intelligent premise security access management workloads and functions 96 may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

Figure 4:
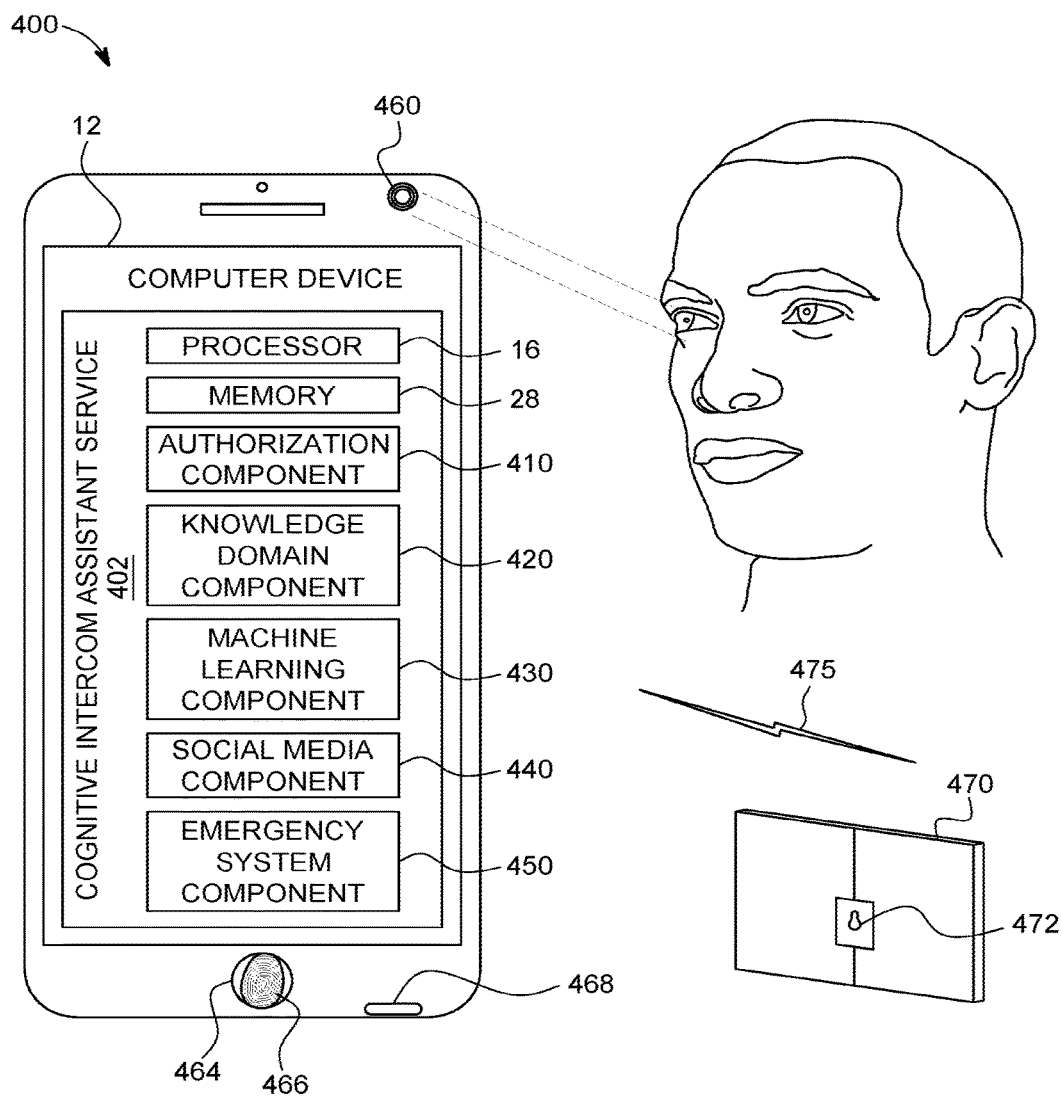
FIG. 4 is an additional block diagram depicting an exemplary functional relationship between various aspects of the present invention.

Turning now to FIG. 4, a block diagram 400 depicting exemplary functional components 400 according to various mechanisms of the illustrated embodiments, is shown. As will be seen, many of the functional blocks may also be considered "modules" of functionality, in the same descriptive sense as has been previously described in FIGS. 1-3. With the foregoing in mind, the module blocks 400 may also be incorporated into various hardware and software components of a system for intelligent premise security access management in accordance with the present invention. Many of the functional blocks 400 may execute as background processes on various components, either in distributed computing components, or on the user device, or elsewhere. Computer system/server 12 ("computer device" which may be an intercom device, a wireless communication device, or other computing device) of FIG. 1 is again shown, incorporating processing unit 16 and memory 28 to perform various computational, data processing and other functionality in accordance with various aspects of the present invention. The computer device 12 may include a cognitive intercom assistant service 402 (e.g., for intelligent premise security access management) installed thereon. The cognitive intercom assistant service 402 may include an authorization component 410, knowledge domain component 420, a machine learning component 430, a social media component 440, and/or an emergency system component 450, each of which may be in communication with and/or controlled by processor 16 with access to memory 28.

By way of example only, the computer device 12 may also include and/or be associated with a premise entry point 470 (e.g., door, entryway, garage door, or other means for ingress/egress to or from a premise) for sending to or receiving from the computer device 12 communication messages via a wireless communication link 475. The premise entry point 470 may also include a securing means 472 such as, for example, a lock. For example, the computer device 12 may signal via the wireless communication link 475 a communication message to the premise entry point 470 with instructions to lock or unlock using the securing means 472 the premise entry point 470.

The computer device 12 may also include a camera device 460 (or camera module for controlling the camera 460) and a biometric detection device 464, for detecting one or more various types of biometric data, such as a fingerprint 466. In one aspect, the camera device 460 may also be a scanning device to capture a bar code. In an additional aspect, the computer device 12 may include one more means for receiving and processing radio frequency identification (RFID) tag data, identification badge data, barcode data, smartcard data, near field communication (NFC) sticker, a quick response (QR) code, barcode, or combination thereof, which may include use of the camera device 460. In one aspect, the computer system/server 12 may be a server, computer, smart phone, intercom device, laptop, tablet, portable television, smart phone, and/or any other computing device having a display such as a graphical user interface (GUI) on a two-dimensional touch screen. Also, a microphone 468 may also be included on the computer device 12 that may capture audio data (e.g., a voice or speech spoken via a user).

The computer device 12 may also include a speaker device to broadcast one or more audible communications or tones such as, for example, "please state your name, occupation, the full name of the person you are visiting, and the reason for your visit."

As one of ordinary skill in the art will appreciate, the depiction of the various functional units in computer system/server 12 (e.g., a mobile device/intercom device) is for purposes of illustration, as the functional units may be located within computer system/server 12 or elsewhere within and/or between distributed computing components.

In one aspect, the authorization component 410 may authorize and authenticate identification information of a user requesting access to enter a premise via a premise entry using a knowledge domain of trusted users. The authorization component 410 may grant entry access to a premise via the premise entry 470 upon authenticating the identification information.

The social media component 440 may collect social media data of a user account of the user. The social media data includes a plurality of media, content posts, social media contacts having a predefined social media distance to the user account, and information relating to the social media contacts. The knowledge domain component 420 may register the social media data of the user account with the knowledge domain of trusted users for the user.

The authorization component 410, the knowledge domain component 420, and/or the social media component 440, individually and/or collectively, may collect public information data of a plurality of persons from one or more public information databases. The public information data of the plurality of persons may be stored and registered in the knowledge domain of trusted users by the knowledge domain component 420. The knowledge domain component 420 may compare the public information data of the plurality of persons to the identification information to determine whether the identification information of the user matches the public information data of one of the plurality of persons.

The authorization component 410 may also request a second level of authentication from a trusted source associated with an occupant of the premise, wherein the trusted source is a user within the knowledge domain of trusted users and authenticates the identification information.

The emergency system component 450 may detect an activation of an emergency alarm system and grant immediate access to the user. The emergency system component 450 may provide an alarm notification to one or more trusted users associated with the knowledge domain of trusted users.

The machine learning component 430 may initialize a machine learning mechanism for learning behavior of the user and social media contacts of the user; and update the knowledge domain of trusted users with a change in information pertaining to the user or social media contacts of a social media account of the user.

The machine learning component 430 may invoke one or more machine learning models to be applied to learning over time behaviors or biometric data of a user for being associated with the trust network (e.g., speaking, communicating via electronic devices, interaction with other caregivers, patients, or persons needing assistance or providing emergency services, etc.) at certain types of event activities associated with providing care and assistance to a premise occupant. In one aspect, one or more devices, such as computer device 12 (e.g., microphone, voice capturing endpoint, retina scanner, heart monitor, video camera, and the like) may be used to capture speech, emotional data, biometric data, and/or psychophysical characteristics or parameters (e.g., electro dermal activity, heart rate, blood pressure, etc.) data. Combined with the machine learning, other functionality of the present invention may identify preference for times of day, days of weeks, or months/years that may be associated with a visitor/trusted user to a premise of an occupant, that may need assistance. The machine learning models may also learn over time what events, activities, or services each of the trusted visitors/persons perform or engage in to assist the premise occupant (e.g., machine learning learns that a nurse visits the home each day at 2:00 pm to check vital signs and assist with meal preparation and medical distribution). The machine learning models may also learn over time what levels of trust are provided to each trusted user in the trust network. The machine learning models may also learn over time those of a social media account that may be a trusted visitor/person according to a defined social distance (e.g., only those related to the premise occupant). The machine learning models may also learn over time those persons restricted to entering a premise or have a defined risk for danger according to the learned social media data of an account of the premise occupant. The trust network may increase, decrease, or evict a trust level of a trusted user based on the machine learning. For example, the machine learning learns that a neighbor recently posted a violent threat towards the premise occupant and signals the trust network to revoke the trust status of the neighbor and list the neighbor in the trust network as a person of danger to the premise occupant. Alternatively, the machine learning models learn that a hospital rotates various caregivers such as, for example, doctors or nurses, according to a defined schedule. The machine learning may then communicate the learned schedule to the trust network so as to enable the trust network to cognitively identify those times/dates (e.g., schedule) when one or more learned or "expected" caregiver-visitors will be visiting the premise occupant.

The machine learning component 430 may apply one or more heuristics and machine learning based models using a wide variety of combinations of methods, such as supervised learning, unsupervised learning, temporal difference learning, reinforcement learning and so forth. Some non-limiting examples of supervised learning which may be used with the present technology include AODE (averaged one-dependence estimators), artificial neural network, backpropagation, Bayesian statistics, naive bays classifier, Bayesian network, Bayesian knowledge base, case-based reasoning, decision trees, inductive logic programming, Gaussian process regression, gene expression programming, group method of data handling (GMDH), learning automata, learning vector quantization, minimum message length (decision trees, decision graphs, etc.), lazy learning, instance-based learning, nearest neighbor algorithm, analogical modeling, probably approximately correct (PAC) learning, ripple down rules, a knowledge acquisition methodology, symbolic machine learning algorithms, sub symbolic machine learning algorithms, support vector machines, random forests, ensembles of classifiers, bootstrap aggregating (bagging), boosting (meta-algorithm), ordinal classification, regression analysis, information fuzzy networks (IFN), statistical classification, linear classifiers, fisher's linear discriminant, logistic regression, perceptron, support vector machines, quadratic classifiers, k-nearest neighbor, hidden Markov models and boosting. Some non-limiting examples of unsupervised learning which may be used with the present technology include artificial neural network, data clustering, expectation-maximization, self-organizing map, radial basis function network, vector quantization, generative topographic map, information bottleneck method, IBSEAD (distributed autonomous entity systems based interaction), association rule learning, apriori algorithm, eclat algorithm, FP-growth algorithm, hierarchical clustering, single-linkage clustering, conceptual clustering, partitional clustering, k-means algorithm, fuzzy clustering, and reinforcement learning. Some non-limiting examples of temporal difference learning may include Q-learning and learning automata. Specific details regarding any of the examples of supervised, unsupervised, temporal difference or other machine learning described in this paragraph are known and are considered to be within the scope of this disclosure.

It should be noted that computer device 12 may be a wireless device, such as an intercom device, a mobile station (MS), a mobile wireless device, a mobile communication device, a tablet, a handset, or other type of wireless device. In one aspect, the wireless device can include at least one of an antenna, a touch sensitive display screen, a speaker, a microphone, a graphics processor, a baseband processor, an application processor, internal memory, a non-volatile memory port, and combinations thereof.

The wireless device can include one or more antennas configured to communicate with a node or transmission station, such as a base station (BS), an evolved Node B (eNB), a baseband unit (BBU), a remote radio head (RRH), a remote radio equipment (RRE), a relay station (RS), a radio equipment (RE), a remote radio unit (RRU), a central processing module (CPM), or other type of wireless wide area network (WWAN) access point. The wireless device can be configured to communicate using at least one wireless communication standard including a third generation partnership project (3GPP) long term evolution (LTE), Wi-Fi/Worldwide Interoperability for Microwave Access (WiMAX) networks, High Speed Packet Access (HSPA), Bluetooth, and Wi-Fi. The wireless device can communicate using separate antennas for each wireless communication standard or shared antennas for multiple wireless communication standards. The wireless device can communicate in a wireless local area network (WLAN), a wireless personal area network (WPAN), and/or a WWAN. The mobile device can include a storage medium. In one aspect, the storage medium can be associated with and/or communicate with the application processor, the graphics processor, the display, the non-volatile memory port, and/or internal memory. In one aspect, the application processor and graphics processor are storage mediums.

Figure 5:
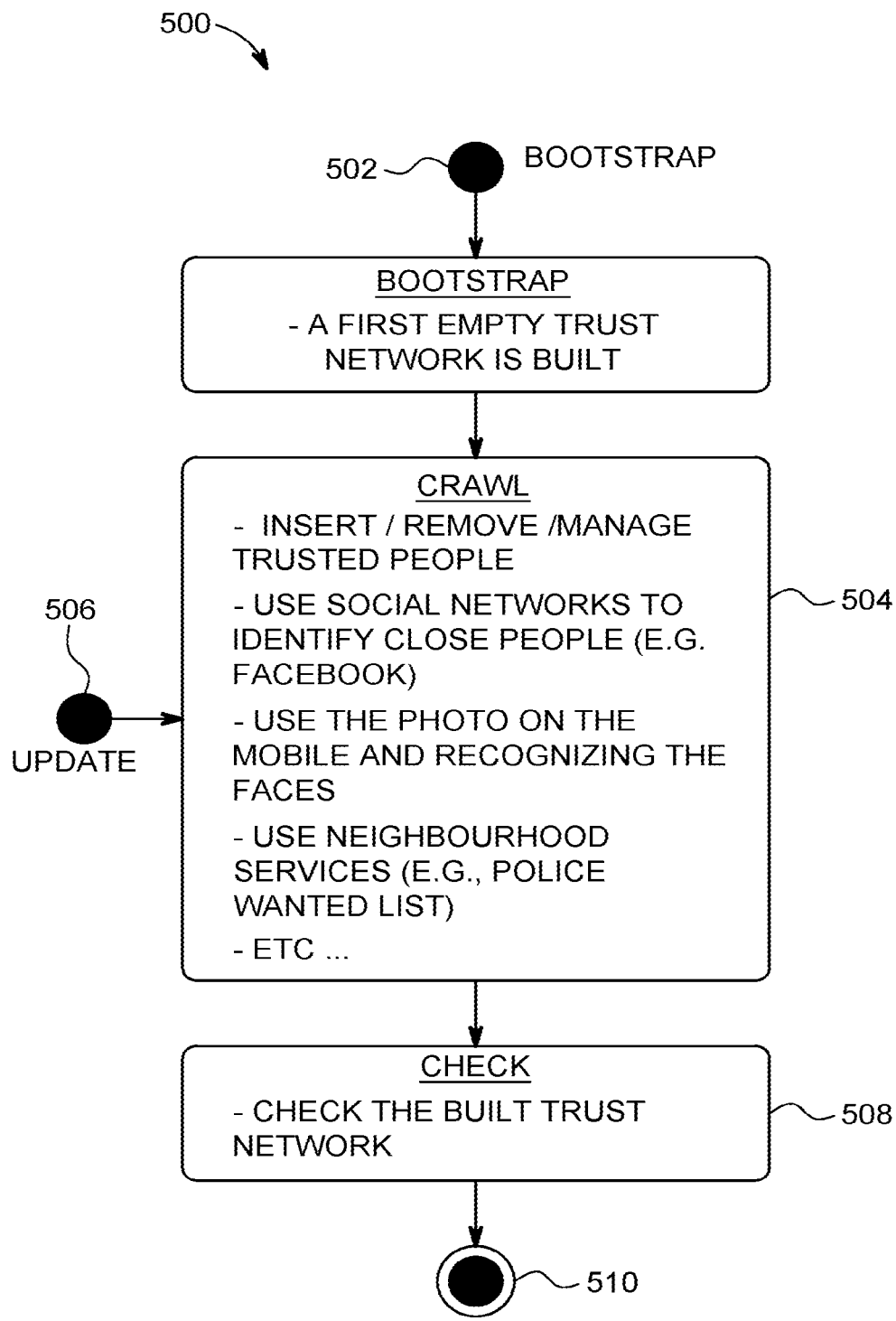
FIG. 5 is a flowchart diagram depicting an additional exemplary method for configuring a cognitive intercom assistant for intelligent premise security access management by a processor, again in which aspects of the present invention may be realized.

In view of FIGS. 1-4, consider, as an illustration of exemplary block/flow diagram (e.g., state diagram) depicting to accomplish various purposes of the present invention, FIG. 5, following. FIG. 5 illustrates exemplary functional blocks 500 for intelligent premise security access management mechanism on specific functionality. Each of the functional blocks 700 may be implemented in hardware and/or software, such as by the computer/server 12 (FIG. 1), and/or the workloads layer 90 (FIG. 3).

Starting in block 502, a bootstrap operation may be performed and a trust network (e.g., a knowledge domain of trusted sources and/or trusted users) may be created. In block 504, information may be entered, inserted, or removed to/from the trusted network related to trusted users. Social media data/information may be collected from one or more trusted users' (e.g., family members, friends, co-workers, caregivers, emergency personnel, etc.) accounts or persons requesting access to a premise. The social media data may include a plurality of media, content posts, and social media contacts having a predefined social media distance to the user account. For example, John Doe may be a neighbor to a premise occupant, Jane Doe who receiving care assistance such as medical assistance. The information pertaining to John Doe may be inputted into the trusted network since John Doe does not have an address book, social media account, or other resource for collected data via an online source, webpage, or web service. Also, using the social media network, information pertaining Jane Doe may also be registered and added to the trusted network such as, for example, information about Jane Doe's acquaintances and family network (e.g., close relationships that may be within a defined social distance or defined social relationship distance such as, for example, a best friend, a person who "likes" a selected number of comments, posts, or media files, a cousin, an uncle/aunt, and the like.

Public databases or websites such as, for example, a law enforcement website, may be accessed to collect data about various types of persons known in the community such as, for example, known dangerous people of the area, amber alert data, or violent person's data. The publicly acquired data may be automatically added and updated. Also, other types of databases or websites such as, for example, a governmental website, may be accessed to collect, for example, data about various emergency or health care services such as, for example, doctors, nurses, fire departments, and ambulance services.

Thus, as part of block 504, biometric data (e.g., a photo) of a visitor may be taken and compared with known persons associated with the trusted network. The comparison may determine or recognize the visitor as a "trusted visitor" associated with the trusted network and provide indication that access may be granted to the premise. For example, if Jane Doe was a visitor to an occupant of a premise using the intelligent premise security access management, Jane Doe would be recognized as a trusted visitor having been previously registered with the trusted network. Also, one or more changes may be made pertaining to each trusted user of the trusted network (e.g., an assigned trust level may be increased or decreased so as to lower priority or increase priority to persons that have or have not accessed the trust network during a selected time period). For example, John Doe may have moved to a different region of a community and has a new address. Thus, the trust level for John Doe may be reduced from a first level of trust (e.g., which may provide to John Doe authorized access to any premise associated with a premise occupant) to a second level of trust (e.g., which may provide to John Doe authorized, but restricted, access to only one defined premise associated with the premise occupant). The trusted network may be updated (continuously) with information about each user within the trusted network, as in block 506.

As depicted in block 508, the trusted network that is created may be checked at one or more selected time periods, and end at block 510.

Figure 6A:
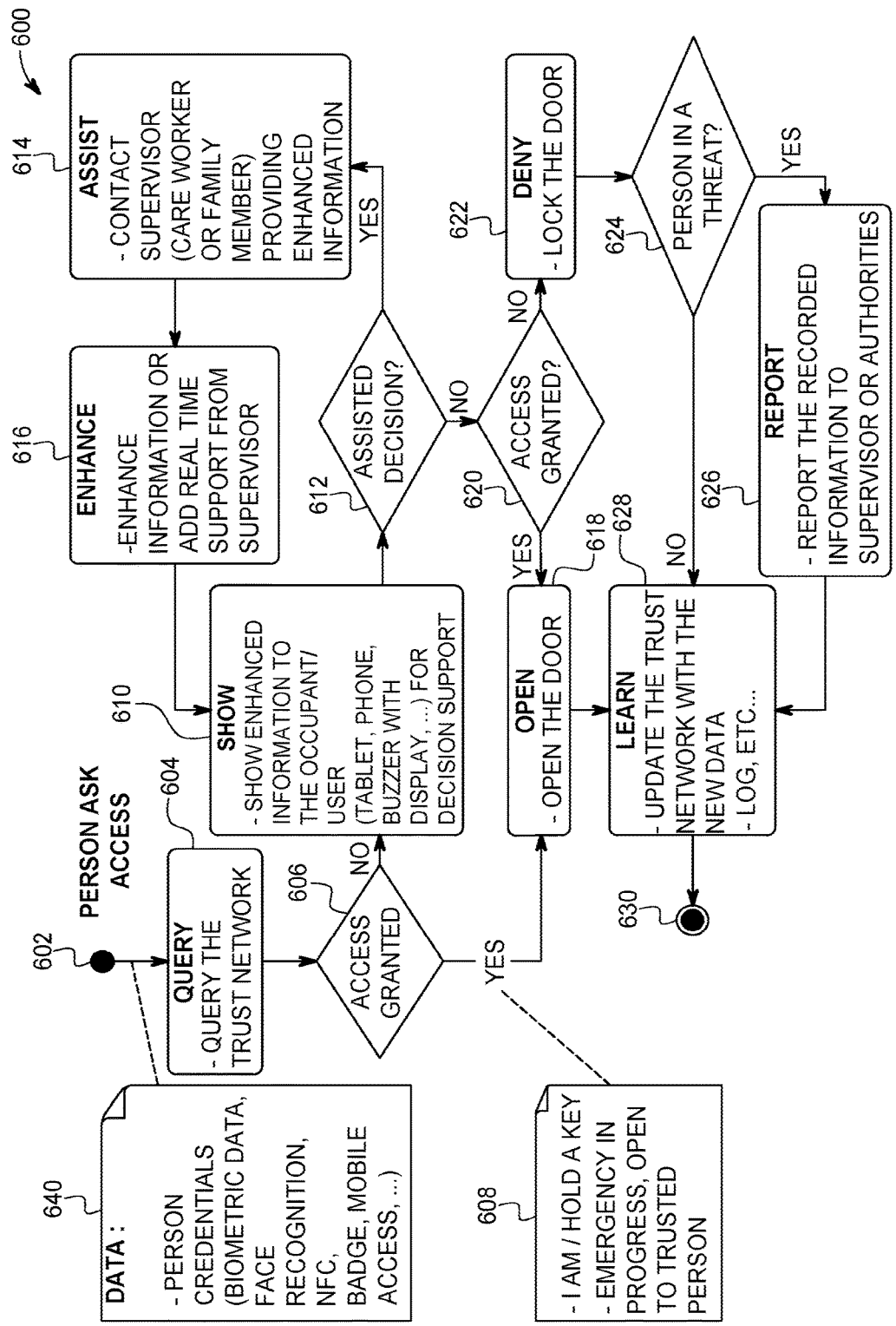
FIG. 6A is a flowchart diagram depicting an additional exemplary method for intelligent premise security access management by a processor, again in which aspects of the present invention may be realized.

Turning now to FIG. 6A is an additional method 600 for intelligent premise security access management by a processor, in which various aspects of the illustrated embodiments may be implemented. The functionality 600 may be implemented as a method executed as instructions on a machine, where the instructions are included on at least one computer readable medium or one non-transitory machine-readable storage medium. The functionality 600 may start in block 602, upon a visitor/user (e.g., nurse or doctor) requesting permission to enter a premise location of an occupant (e.g., elderly person needing medical assistance or care) of the premise. A trust network 640 (e.g., a knowledge domain of trusted person) may be queried, as in block 604. The trust network 640 may receive and determine the person's credentials (e.g., biometric data, face recognition data, NFC, badge, etc.), the location information of the occupant (e.g., home, hospital, room, etc.), and a status of the occupant of the premise (e.g., patient that may be experiencing an emergency or is asleep).

Based upon the data received or supplied by the trust network 640, a determination operation is performed to determine that access to the premise is granted for the visitor (e.g., the visitor is granted or denied access to the premise), as in block 606. If yes at block 606 and the visitor is granted access via the information data being validated and authenticated indicating the visitor is a trusted visitor associated with the trust network (also granted based on the person also possessing a key, emergency is detected and access is provided to the trusted person as in block 608), a premise entry point (e.g., a door) may be unlocked and/or opened, as in block 618. If no at block 606 (access to the premise is not granted), additional data may be requested from the visitor such as, for example, a request to show enhanced information such as biometric data, RFID tag data, identification badge data, barcode data, smartcard data, near field communication (NFC) sticker, a quick response (QR) code, barcode, or combination thereof and may be communicated to a computing device associated with the occupant of the premise (e.g., mobile device, smart phone, tablet, computer, television, etc.,) for additional level of security and support in determining whether to grant access to the visitor, as in block 610. A determination operation is made to determine if assistance is provided in determining whether to grant access to the visitor, as in block 612. If yes, a supervisor or person of authority associated with the visitor (e.g., a nurse's immediate supervisor or a person's parent) may be contacted to provide enhanced information, as in block 614. The enhanced information may be updated and/or added (in real time) and provide support from the supervisor or person of authority associated with the visitor, as in block 616, which may then return to block 610 for immediate or later use.

If no at block 612, a determination operation is performed to determine to grant access to the visitor, as in block 620. If yes at block 620 and the determination is made to grant access to the visitor, the premise entry point (e.g., a door) may be unlocked and/or opened, as in block 618.

If no at block 620 and the decision is not to grant access to the visitor, the premise entry point (e.g., door) may be locked, as in block 622. From block 622, a determination operation may be performed to determine if the visitor is a threat, as in block 624. If no, the functionality may move to block 628 and update the trust network with new or updated data, provide a timestamp, and/or log the changes. If yes at block 624, the visitor may be reported to one or more supervisors of the visitor and/or to emergency service providers (e.g., law enforcement), as in block 626. The functionality 600 may end in block 630.

In view of FIG. 6A, consider the following example of various implementations of the aforementioned functionality as illustrated in FIGS. 6B-6H. That is, depending on a certain condition, all or only a few steps may be performed based on the condition. With the foregoing in mind and as a preliminary matter, the systems 650, 655, 660, 665, 670, 675, and 680 of FIGS. 6B-6H respectively, may also be incorporated into various hardware and software components of the cognitive intercom assistant service 402 of FIG. 4 in accordance with the present invention, such as those described in FIGS. 1-4.

Figure 6B:
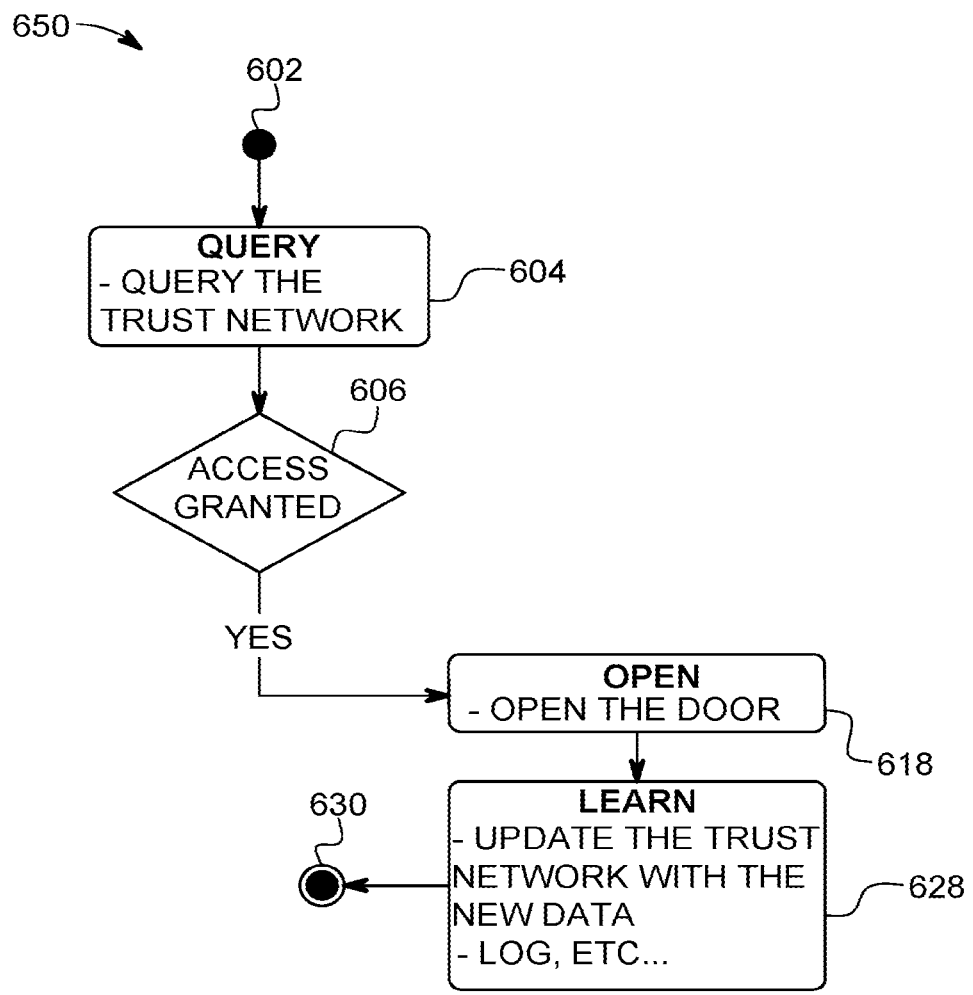
FIG. 6B is a flowchart diagram depicting an additional exemplary method for providing intelligent premise security access to a trusted user by a processor, again in which aspects of the present invention may be realized.

FIG. 6B is a flowchart diagram depicting an additional exemplary method 650 for providing intelligent premise security access to a trusted user by a processor. Assume for purposes of FIG. 6B, Jane Doe goes to visit her mother, Jayne Doe. The functionality 650 may start in block 602, upon a visitor/user (e.g., Jane Doe, a daughter of Jayne Doe) requesting permission to enter a premise location of an occupant (e.g., Jayne Doe, who may be an elderly person needing medical assistance or care) of the premise. The trust network 640 (e.g., a knowledge domain of trusted persons) may be queried, as in block 604.

Based upon the data received or supplied by the trust network 640 and because Jane Doe is detected as a trusted person of Jayne Doe and is registered in the trust network, the trust network authorizes Jane Doe and access to the premise is granted for the visitor (e.g., the visitor is granted or denied access to the premise), as in block 606. A premise entry point (e.g., a door) may be unlocked and/or opened, as in block 618. The trust network may be updated with new or updated data, a timestamp, log the changes, or a combination thereof such as, for example, the trust network may be updated with a record with a timestamp that access was granted for Jane Doe, as in block 628. The functionality 650 may end in block 630.

Figure 6C:
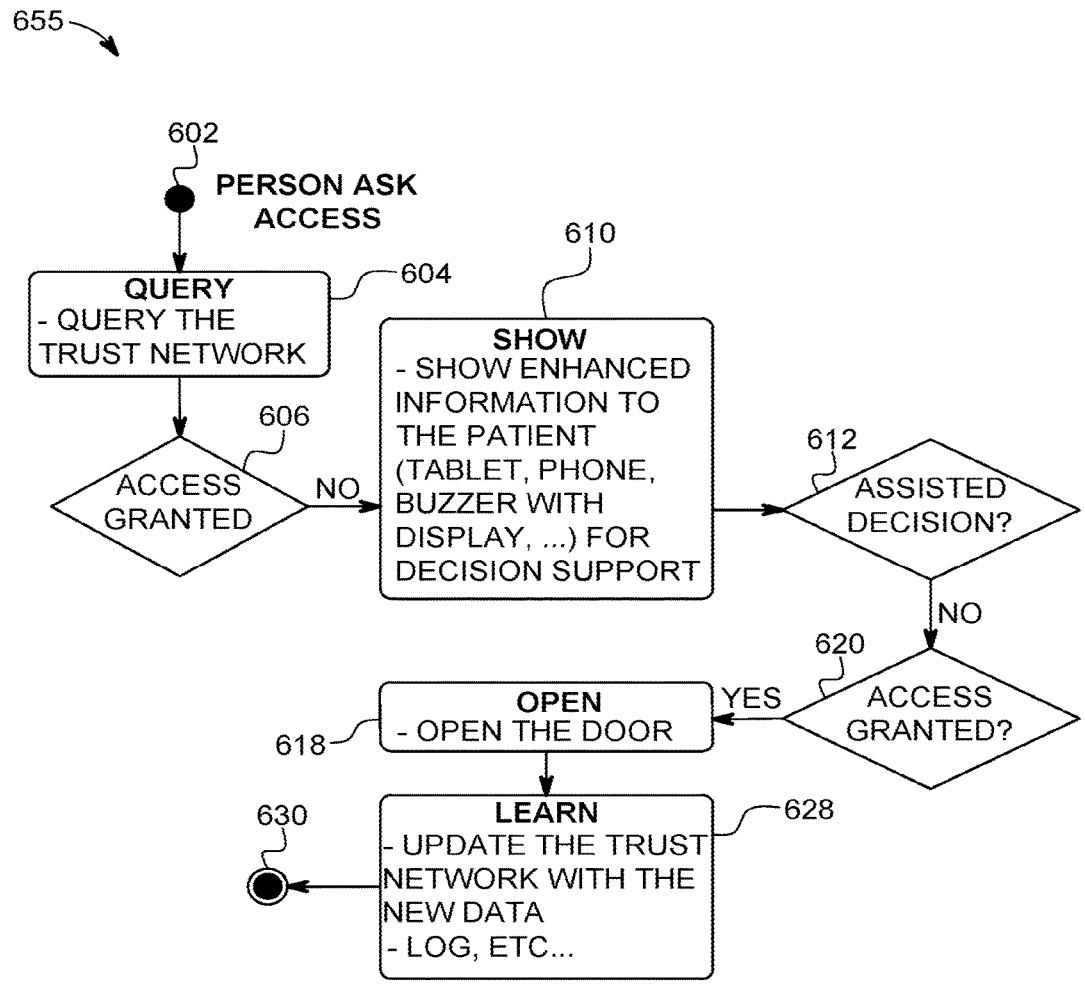
FIG. 6C is a flowchart diagram depicting an additional exemplary method for providing intelligent premise security access to a user by a processor, again in which aspects of the present invention may be realized.

FIG. 6C is a flowchart diagram depicting an additional exemplary method 655 for providing intelligent premise security access to a user by a processor. Assume for purposes of FIG. 6C, John Doe goes to visit his neighbor, Jon Doe, who may be a person with limited physical capacities and requires care and/or assistance for various tasks. The functionality 655 may start in block 602, upon a visitor/user (e.g., John Doe) requesting permission to enter a premise location of an occupant (e.g., Jon Doe, who may be an elderly person needing medical assistance or care) of the premise. The trust network 640 (e.g., a knowledge domain of trusted person) may be queried, as in block 604.

Based upon the data received or supplied by the trust network 640 and because John Doe may be an unknown person of Jon Doe, the trust network does not authorize John Doe and does not grant access to the premise, as in block 606. Additional data may be requested from the visitor (e.g., John Doe) which may then be communicated to a computing device associated with the occupant (Jon Doe) of the premise (e.g., mobile device, smart phone, tablet, computer, television, etc.) for an additional level of security and support in determining whether to grant access to the visitor, as in block 610.

A determination operation is made to determine if assistance is provided in determining whether to grant access to the visitor, as in block 612. If no at block 612, a determination operation is performed to determine whether or not to grant access to the visitor, as in block 620. If yes at block 620 and the determination is made to grant access to the visitor, the premise entry point (e.g., a door) may be unlocked and/or opened, as in block 618. For example, information about John Doe such as, for example, a photographic image or live video feed may be displayed on the smart phone or intercom device of the premise of Jon Doe. This additional information may then be recognized by the trust network after a second authentication operation is performed on the additional data. The smart phone or intercom device of the premise occupant (e.g., Jon Doe) may now see an indication (e.g., a green light indicating authenticated as a trusted person) indicating the visitor is a trusted visitor.

The trust network may be updated with new or updated data, a timestamp, log the changes, or a combination thereof such as, for example, the trust network may be updated with a record with a timestamp that access was granted for John Doe, as in block 628.

Figure 6D:
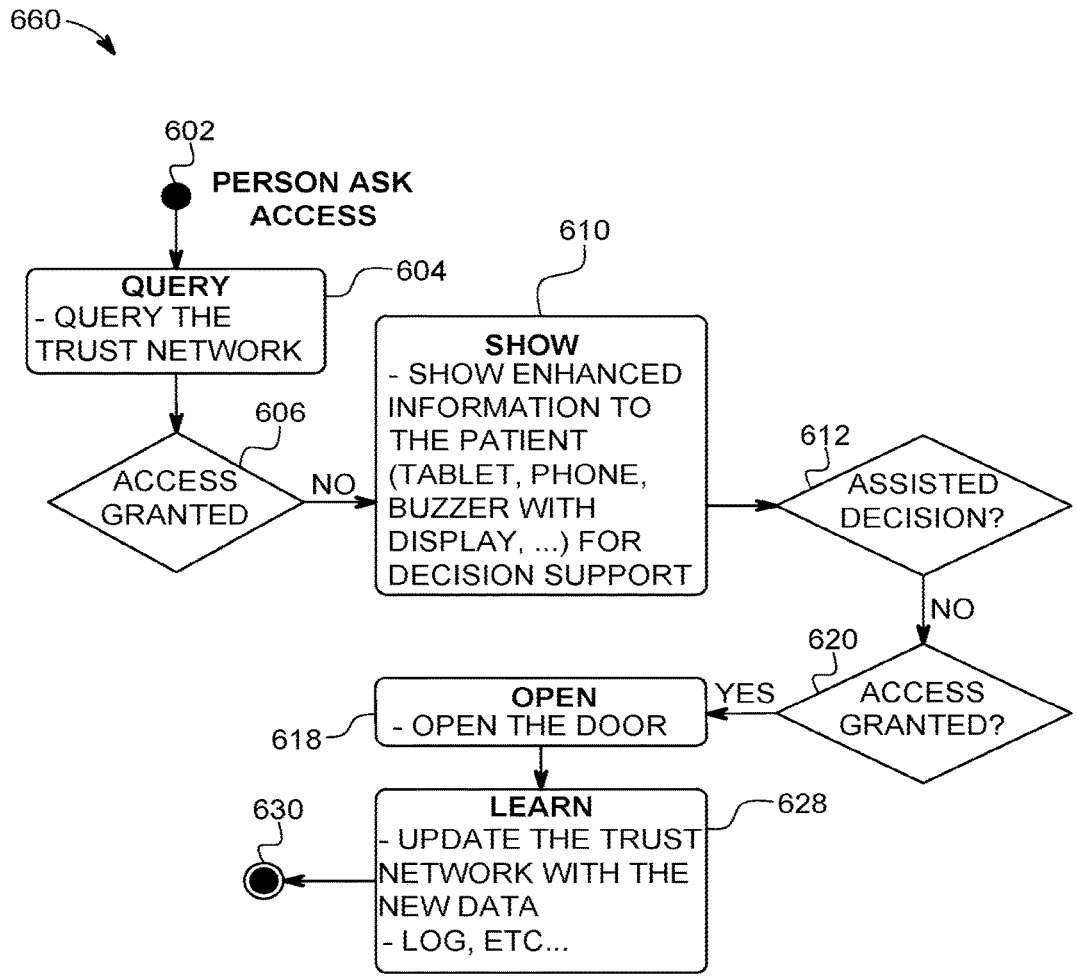
FIG. 6D is a flowchart diagram depicting an additional exemplary method for providing intelligent alternative premise security access to a trusted user by a processor, again in which aspects of the present invention may be realized.

It should be noted that each of the reduced steps and operations of functionality 655 of FIG. 6C may also apply to the functionality 660 of FIG. 6D for providing intelligent alternative premise security access to a trusted user by a processor. For example, functionality 660 may be applied for granting access to a visitor for access to a temporary or alternative premise when a premise occupant may be in a location other than a permanent residence (e.g., home or apartment). For example, Jane Doe may be a person with limited physical capacities and requires care and/or assistance but is taken from her home to a hospital. The trust network may detect the new premise location for Jane Doe and adapts to the new or temporary premise. John Doe decides to visit his neighbor, Jane Doe, who is now hospitalized. Similar to functionality 655, John Doe may be recognized as a trusted person and Jane Doe is notified of John Doe as a trusted visitor and access granted to John Doe for authorization to enter a premise entry point (e.g., a door of the hospital room of Jane Doe).

Figure 6E:
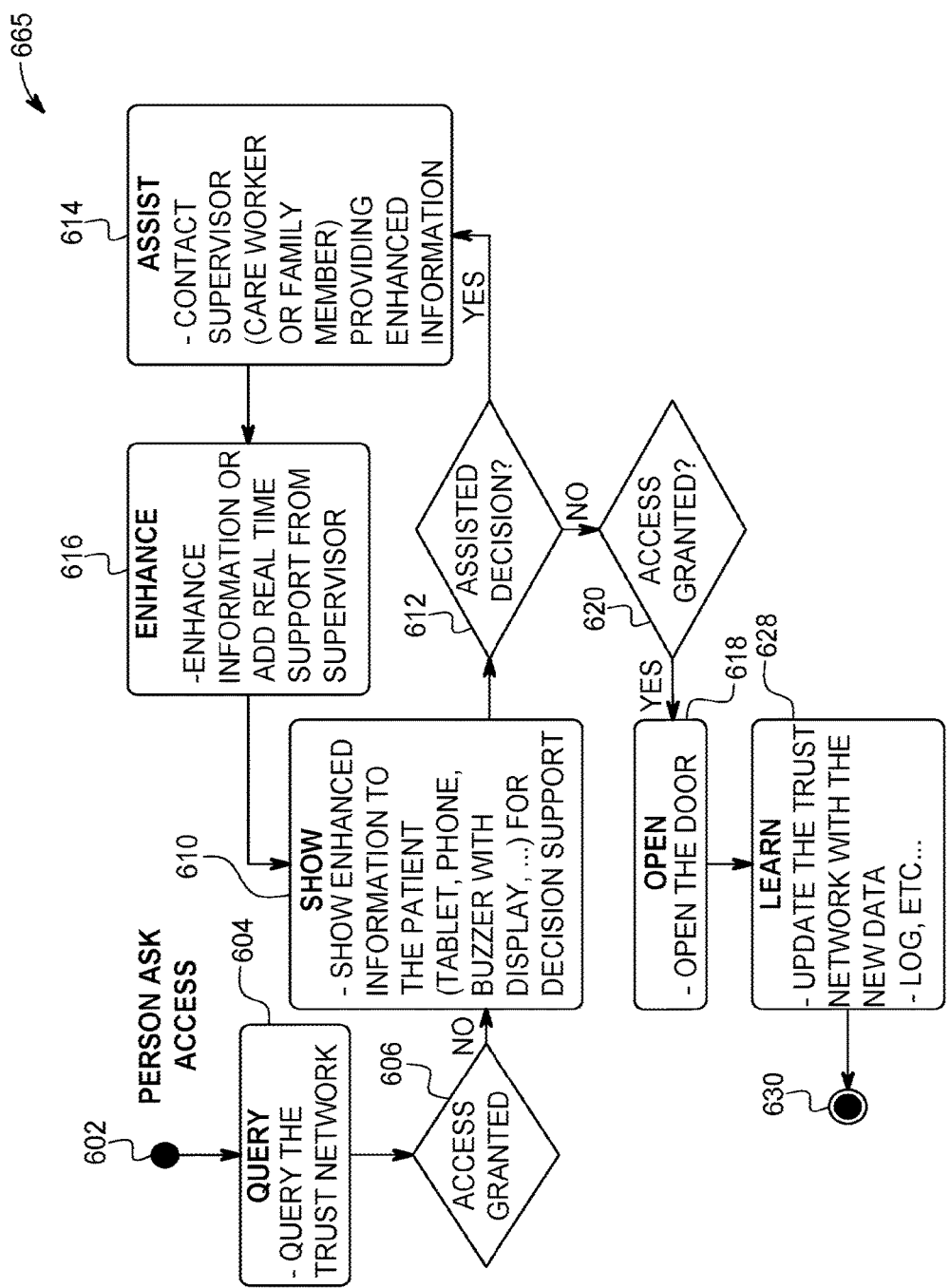
FIG. 6E is a flowchart diagram depicting an additional exemplary method for providing intelligent premise security access to a new user by a processor, again in which aspects of the present invention may be realized.

FIG. 6E is a flowchart diagram depicting an additional exemplary method for providing intelligent premise security access to a new user by a processor. Assume for purposes of FIG. 6E, John Doe is a pharmacist's son delivering Jane Doe, who may be a person with limited physical capacities and requires care and/or assistance, prescribed medication. The functionality 665 may start in block 602, upon a visitor/user (e.g., John Doe) requesting permission to enter a premise location of an occupant (e.g., Jane Doe, who may be an elderly person needing medical assistance or care) of the premise. The trust network 640 (e.g., a knowledge domain of trusted person) may be queried, as in block 604.

Based upon the data received or supplied by the trust network 640 and because John Doe may be an unknown person of Jane Doe, the trust network does not immediately authorize John Doe and does not grant access to the premise, as in block 606. A warning alert signal may be provided to Jane Doe (e.g., a "yellow" light on a mobile device or intercom system indicating warning or caution as to the visitor). As such, additional data may be requested from the visitor (e.g., John Doe) which may then be communicated to a computing device associated with the occupant (Jane Doe) of the premise (e.g., mobile device, smart phone, tablet, computer, television, etc.,) for additional level of security and support in determining whether to grant access to the visitor, as in block 610.

A determination operation is made to determine if assistance is provided in determining whether to grant access to the visitor, as in block 612. If yes, a supervisor or person of authority associated with the visitor (e.g., John Doe's father who is the pharmacist) may be contacted to provide enhanced information, as in block 614. For example, the mobile device or intercom system of the Jane Doe, the premise occupant, may automatically call, text, or email the pharmacist requesting the enhanced information (e.g., verification as to the identity of John Doe who indicates he is delivering the prescribed medication for his father, the pharmacist). The enhanced information may be updated and/or added (in real time) and provide support from the supervisor or person of authority (e.g., the pharmacist) associated with the visitor (John Doe), as in block 616, which may then return to block 610 for immediate or later use.

If no at block 612, a determination operation is performed to determine whether to grant access to the visitor, John Doe, as in block 620. If yes at block 620 and the determination is made to grant access to the visitor, John Doe, the premise entry point (e.g., a door) may be unlocked and/or opened, as in block 618. For example, information about John Doe such as, for example, a photographic image or live video feed may be displayed on the smart phone or intercom device of the premise of Jane Doe. This additional information may then be recognized by the trust network after a second authentication operation is performed on the additional data. The smart phone or intercom device of the premise occupant (e.g., Jane Doe) may now see an updated indication (e.g., a green light indicating John Doe as an authenticated, trusted person) indicating the visitor, John Doe, is a trusted visitor.

The trust network may be updated with new or updated data, a timestamp, log the changes, or a combination thereof such as, for example, the trust network may be updated with a record with a timestamp that access was granted for John Doe, as in block 628. The functionality 665 may end in block 630.

Figure 6F:
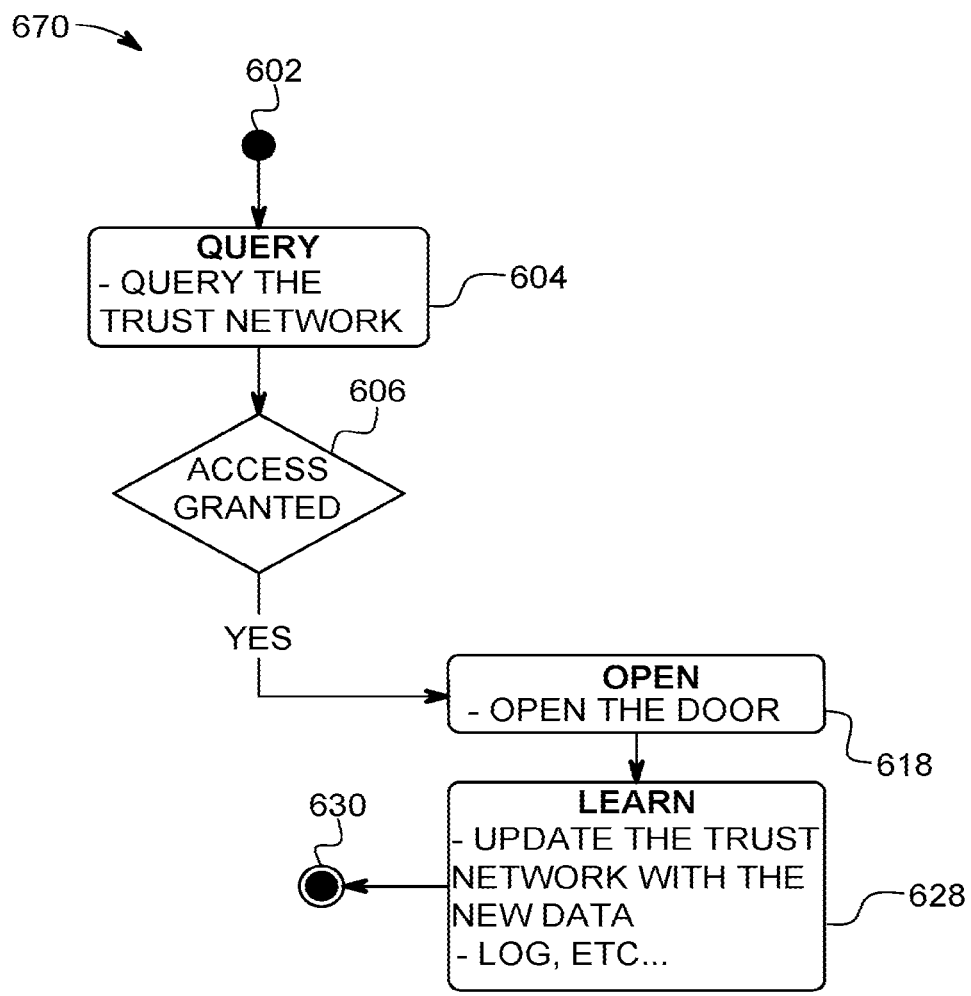
FIG. 6F is a flowchart diagram depicting an additional exemplary method for providing intelligent premise security access during a detected emergency by a processor, again in which aspects of the present invention may be realized.

FIG. 6F is a flowchart diagram depicting an additional exemplary method 670 for providing intelligent premise security access during a detected emergency by a processor. Assume for purposes of FIG. 6F, Jane Doe is a person of limited physical capacities, the only occupant in a home, and falls down stairs in her home. An external system (e.g., external to the intelligent premise security access functionality) such as, for example, a panic button, fall detector, or other emergency alert system, may recognize the emergency (e.g., falling down the stairs). John Doe, a closest medical service provider (e.g., doctor), is managing the emergency alert calls and rushes to the premise location of Jane Doe. The functionality 670 may start in block 602, upon a visitor/user (e.g., John Doe, a registered Doctor recognized by the trusted network) requesting permission to enter a premise location of an occupant (e.g., Jane Doe) of the premise. The trust network 640 (e.g., a knowledge domain of trusted person) may be queried, as in block 604.

Based upon the data received or supplied by the trust network 640 and because John Doe is detected as a trusted person and is registered in the trust network, the trust network authorizes John Doe and grants authority and access to the premise location of Jane Doe, as in block 606. A premise entry point (e.g., a door) may be unlocked and/or opened, as in block 618. The trust network may be updated with new or updated data, a timestamp, log the changes, or a combination thereof such as, for example, the trust network may be updated with a record with a timestamp that access was granted for John Doe, as in block 628. The functionality 670 may end in block 630.

Figure 6G:
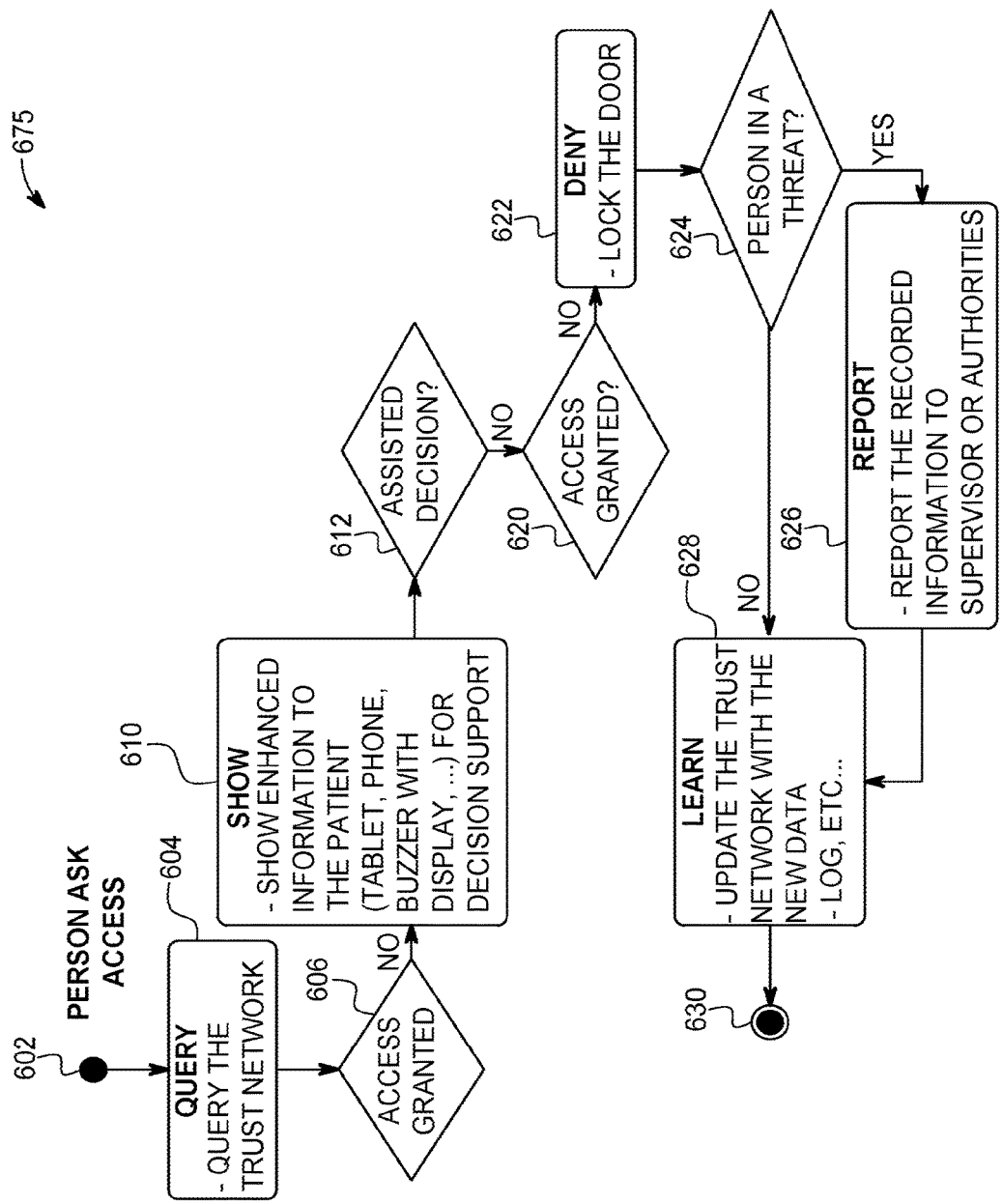
FIG. 6G is a flowchart diagram depicting an additional exemplary method for detecting a threat using a cognitive intercom assistant by a processor, again in which aspects of the present invention may be realized.

FIG. 6G is a flowchart diagram depicting an additional exemplary method for detecting a threat using a cognitive intercom assistant by a processor. Assume for purposes of FIG. 6G, Jane Doe is a premise occupant and is a person with limited physical capacities and requires care and/or assistance for various tasks. Assume that John Doe is a wanted criminal in a selected jurisdiction as provided by a law enforcement database and is registered in the trust network as a wanted criminal. Assume John Doe visits Jane Doe.

The functionality 675 may start in block 602, upon a visitor/user (e.g., John Doe) requesting permission to enter a premise location of an occupant (e.g., Jane Doe, who may be an elderly person needing medical assistance or care) of the premise. The trust network 640 (e.g., a knowledge domain of trusted person) may be queried, as in block 604.

Based upon the data received or supplied by the trust network 640 and because John Doe may be detected as a wanted criminal, the trust network does not authorize John Doe and does not grant access to the premise, as in block 606. A warning alert (e.g., a red flag, alarm, or alert) may be provided to a computing device of the premise occupant such as, for example, Jane Doe. For example, information about John Doe such as, for example, a photographic image or live video feed may be displayed on the smart phone or intercom device of the premise of Jane Doe with a flashing red warning "alert" or "alarm" being displayed or broadcast via the smart phone or intercom device. Additional data may be requested from the visitor (e.g., John Doe) which may then be communicated to a computing device associated with the occupant (Jane Doe) of the premise (e.g., mobile device, smart phone, tablet, computer, television, etc.,) for additional level of security and support in determining whether to grant access to the visitor, as in block 610.

A determination operation is made to determine if assistance is provided in determining whether to grant access to the visitor, as in block 612. If no at block 612, a determination operation is performed to determine whether to grant access to the visitor, as in block 620. If no at block 620 and the decision is not to grant access to the visitor, John Doe the wanted criminal, the premise entry point (e.g., door) may be locked, as in block 622. From block 622, a determination operation may be performed to determine if the visitor, John Doe, is a threat, as in block 624. If no, the functionality may move to block 628 and update the trust network with new or updated data, timestamp and log the changes. If yes at block 624, the visitor may be reported to one or more supervisors of the visitor and/or to emergency service providers (e.g., law enforcement), as in block 626. The trust network may be updated with new or updated data, timestamp and log the changes such as, for example, recording in the trust network for John Doe that access was not authorized or granted and local law enforcement was notified, as in block 628. The functionality 675 may end in block 630.

Similar to the functionality of FIG. 6G, FIG. 6H is a flowchart diagram depicting an additional exemplary method for detecting an additional threat using a cognitive intercom assistant. Assume for purposes of FIG. 6H, Jane Doe is a premise occupant and is a person with limited physical capacities and requires care and/or assistance for various tasks. Assume that John Doe is a violent person known to local law enforcement agencies in a selected jurisdiction and is registered in the trust network as a violent person. Assume John Doe visits Jane Doe. While John Doe is at the premise, the cognitive intercom assistant providing the intelligent premise security access, detects a threat being displayed by John Doe such as, for example, an inflection in decibel levels of voice tone, one or more defined bodily gestures cognitively identified as or associated with violent or dangerous behavior, emotional expressions displayed on John Doe's face, and/or even one or more words or sentences understood or interpreted by the cognitive intercom assistant as offensive or abuse language or conversation. Thus, executing functionality 680, which may be similar to the reduced functionality 675 of FIG. 6G, John Doe is denied authorization and denied access to a premise entry point of a premise location of Jane Doe. The detected threat may also be reported to one or more emergency service providers such as, for example, a law enforcement agency.

In view of FIGS. 1-5 and 6A-6H, it should be noted as an additional aspect, a cognitive intercom assistant providing the intelligent premise security access may detect an emergency device (e.g., a fire alarm) issuing an alert/alarm (e.g., John Doe, a neighbor of Jane Doe, pulled a fire alarm in the apartment building of a home of Jane Doe). John Doe, who may have restricted access to Jane Doe's home (e.g., only 1 time per week for authorizations to enter a premise to merely do a site inspection and weekly checkup), may be immediately granted authorization and access to Jane Doe's home such as, for example, to assist with evacuating Jane Doe from the premise to avoid a potential hazard or danger. The cognitive intercom assistant providing the intelligent premise security access may provide an alert/alarm warning to each trusted user of the trust network (e.g., knowledge domain of trusted sources/trusted users) that John Doe has been granted authorization and access to Jane Doe's home to assist with evacuating Jane Doe's home such as, for example, to assist with evacuating Jane Doe from the premise to avoid a potential hazard or danger. The trust network may be updated and timestamped. Also, the trust network may log all relevant information relating to John Doe's grant and authorization of access to Jane Doe's premises.

Figure 7:
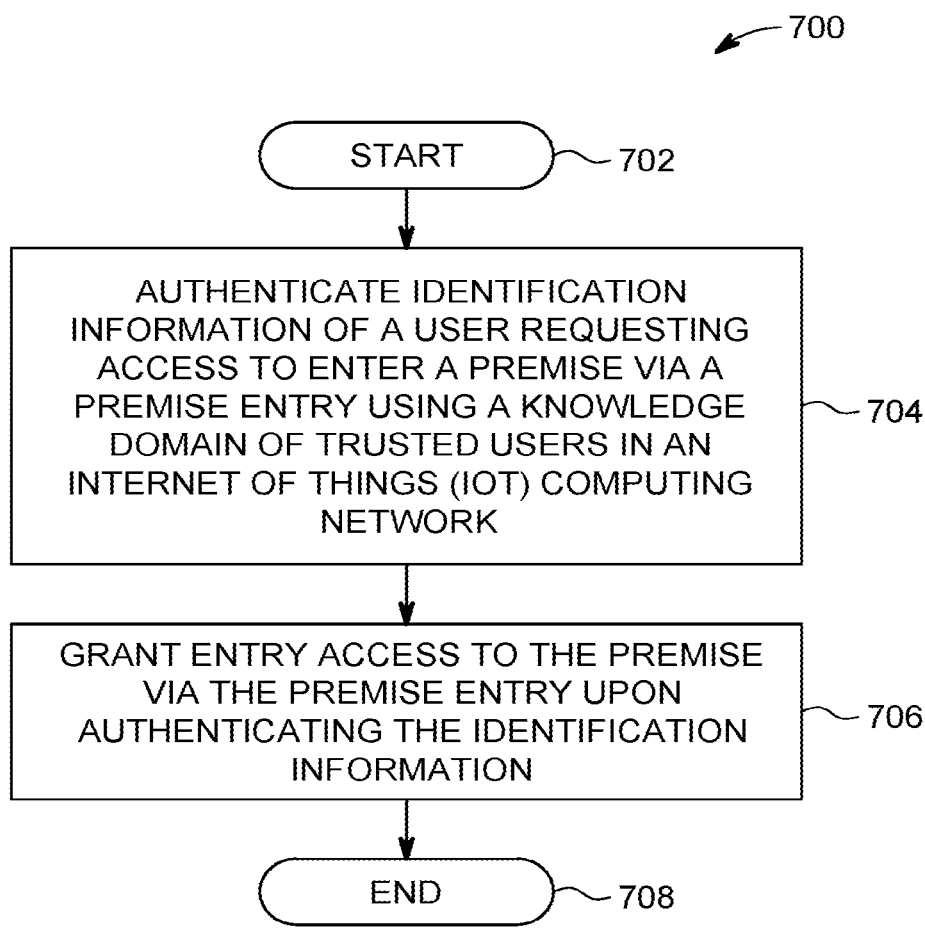
FIG. 7 is an additional flowchart diagram depicting an additional exemplary method for intelligent premise security access management by a processor, again in which aspects of the present invention may be realized.

FIG. 7 is an additional method 700 for intelligent premise security access management by a processor, in which various aspects of the illustrated embodiments may be implemented. The functionality 700 may be implemented as a method executed as instructions on a machine, where the instructions are included on at least one computer readable medium or one non-transitory machine-readable storage medium. The functionality 700 may start in block 702. Identification information of a user requesting access to enter a premise via a premise entry may be authenticated using a knowledge domain of trusted users in an Internet of Things (IoT) computing network, as in block 704. Entry access to the premise may be granted via the premise entry upon authenticating the identification information, as in block 706. The functionality 700 may end in block 708.

In one aspect, in conjunction with and/or as part of at least one block of FIG. 7, the operations of method 700 may include each of the following. The operations of method 700 may include receiving the identification information from one of a plurality of devices, wherein the identification information includes biometric data, radio frequency identification (RFID) tag data, identification badge data, barcode data, or smartcard data.

The operations of method 700 may include collecting social media data of a user account of the user, wherein the social media data includes a plurality of media, content posts, social media contacts having a predefined social media distance to the user account, and information relating to the social media contacts, and/or registering the social media data of the user account with the knowledge domain of trusted users for the user.

In an additional aspect, public information data of a plurality of persons may be collected/received from one or more public information databases. The public information data of the plurality of persons may be stored and/or registered in the knowledge domain of trusted users. The public information data of the plurality of persons may be compared to the identification information to determine whether the identification information of the user matches the public information data of one of the plurality of persons.

Also, a second level of authentication may be requested and/or acquired from a trusted source associated with an occupant of the premise. The trusted source may be a trusted user of the knowledge domain of trusted users and authenticates the identification information.

The operations of method 700 may also include initializing a machine learning mechanism for learning behavior of the user and social media contacts of the user; and updating the knowledge domain of trusted users with a change in information pertaining to the user or social media contacts of a social media account of the user.

In an additional aspect, the operations of method 700 may also detect an activation of an emergency alarm system, grant immediate access to the user, and provide an alarm notification to one or more trusted users associated with the knowledge domain of trusted users.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method for intelligent premise security access management by a processor, comprising:
   authenticating identification information of a user requesting access to enter a premise via a premise entry using a knowledge domain of trusted users in an Internet of Things (IoT) computing network;
   granting entry access to the premise via the premise entry upon authenticating the identification information;
   collecting public information data of a plurality of persons from one or more public information databases including automatically collecting social media data of a user account of the user, wherein the social media data includes a plurality of media, content posts, social media contacts having a predefined social media distance to the user account, and information relating to the social media contacts;
   storing the public information data of the plurality of persons and registering the social media data of the user account in the knowledge domain of trusted users; and
   comparing the public information data of the plurality of persons to the identification information to determine whether the identification information of the user matches the public information data of one of the plurality of persons.

2. The method of claim 1, further including receiving the identification information from one of a plurality of devices, wherein the identification information includes biometric data, radio frequency identification (RFID) tag data, identification badge data, barcode data, or smartcard data.

3. The method of claim 1, further including requesting a second level of authentication from a trusted source associated with an occupant of the premise, wherein the trusted source is a user included within the knowledge domain of trusted users and authenticates the identification information.

4. The method of claim 1, further including:
   initializing a machine learning mechanism for learning behavior of the user and social media contacts of the user; and
   updating the knowledge domain of trusted users with a change in information pertaining to the user or social media contacts of a social media account of the user.

5. The method of claim 1, further including:
   detecting an activation of an emergency alarm system;
   granting immediate access to the user; and
   providing an alarm notification to one or more trusted users associated with the knowledge domain of trusted users.

6. A system for intelligent premise security access management, comprising:
   one or more computers with executable instructions that when executed cause the system to:
      authenticate identification information of a user requesting access to enter a premise via a premise entry using a knowledge domain of trusted users in an Internet of Things (IoT) computing network;
      grant entry access to the premise via the premise entry upon authenticating the identification information;
      collect public information data of a plurality of persons from one or more public information databases including automatically collecting social media data of a user account of the user, wherein the social media data includes a plurality of media, content posts, social media contacts having a predefined social media distance to the user account, and information relating to the social media contacts;
      store the public information data of the plurality of persons and registering the social media data of the user account in the knowledge domain of trusted users; and
      compare the public information data of the plurality of persons to the identification information to determine whether the identification information of the user matches the public information data of one of the plurality of persons.

7. The system of claim 6, wherein the executable instructions receive the identification information from one of a plurality of devices, wherein the identification information includes biometric data, radio frequency identification (RFID) tag data, identification badge data, barcode data, or smartcard data.

8. The system of claim 6, wherein the executable instructions request a second level of authentication from a trusted source associated with an occupant of the premise, wherein the trusted source is a user included within the knowledge domain of trusted users and authenticates the identification information.

9. The system of claim 6, wherein the executable instructions:
   initialize a machine learning mechanism for learning behavior of the user and social media contacts of the user; and
   update the knowledge domain of trusted users with a change in information pertaining to the user or social media contacts of a social media account of the user.

10. The system of claim 6, wherein the executable instructions:
    detect an activation of an emergency alarm system;
    grant immediate access to the user; and
    provide an alarm notification to one or more trusted users associated with the knowledge domain of trusted users.

11. A computer program product for intelligent premise security access management by a processor, the computer program product comprising a non-transitory computer-readable storage medium having computer-readable program code portions stored therein, the computer-readable program code portions comprising:
    an executable portion that authenticates identification information of a user requesting access to enter a premise via a premise entry using a knowledge domain of trusted users in an Internet of Things (IoT) computing network;
    an executable portion that grants entry access to the premise via the premise entry upon authenticating the identification information;
    an executable portion that collects public information data of a plurality of persons from one or more public information databases including automatically collecting social media data of a user account of the user, wherein the social media data includes a plurality of media, content posts, social media contacts having a predefined social media distance to the user account, and information relating to the social media contacts;
    an executable portion that stores the public information data of the plurality of persons and registering the social media data of the user account in the knowledge domain of trusted users; and an executable portion that compares the public information data of the plurality of persons to the identification information to determine whether the identification information of the user matches the public information data of one of the plurality of persons.

12. The computer program product of claim 11, further including an executable portion that receives the identification information from one of a plurality of devices, wherein the identification information includes biometric data, radio frequency identification (RFID) tag data, identification badge data, barcode data, or smartcard data.

13. The computer program product of claim 11, further including an executable portion that:
   initializes a machine learning mechanism for learning behavior of the user and the social media contacts of the user; and
   updates the knowledge domain of trusted users with a change in information pertaining to the user or social media contacts of a social media account of the user.

14. The computer program product of claim 11, further including an executable portion that requests a second level of authentication from a trusted source associated with an occupant of the premise, wherein the trusted source is a user included within the knowledge domain of trusted users and authenticates the identification information.

15. The computer program product of claim 11, further including an executable portion that:
   detects an activation of an emergency alarm system;
   grants immediate access to the user; and
   provides an alarm notification to one or more trusted users associated with the knowledge domain of trusted users.

* * * * *